United States Patent [19]
Iwata et al.

[11] Patent Number: 6,088,490
[45] Date of Patent: Jul. 11, 2000

[54] APPARATUS FOR PROCESSING TWO-DIMENSIONAL INFORMATION

[75] Inventors: Atsushi Iwata, Higashihiroshima; Makoto Nagata, Hiroshima, both of Japan

[73] Assignee: President of Hiroshima University, Higashihiroshima, Japan

[21] Appl. No.: 09/047,378

[22] Filed: Mar. 25, 1998

[30] Foreign Application Priority Data

Mar. 28, 1997 [JP] Japan ..................................... 9-078025

[51] Int. Cl.[7] ...................................................... G06K 7/00
[52] U.S. Cl. ........................................... 382/312; 382/317
[58] Field of Search ..................................... 382/312, 317; 708/7; 712/11; 706/26

[56] References Cited

U.S. PATENT DOCUMENTS

| | | | |
|---|---|---|---|
| 4,905,143 | 2/1990 | Takahashi et al. | 712/11 |
| 5,166,539 | 11/1992 | Uchimura et al. | 76/26 |
| 5,321,639 | 6/1994 | Krishnamoorthy et al. | 708/7 |

OTHER PUBLICATIONS

Atsushi Iwata, et al., "A concept of Analog–Digital Merged Circuit Architecture for Future VLSI's", IEICE Transactions on Fundamentals of Electronics, Communications and Computer Sciences, vol. E79–A, No. 2, Feb. 1996, pp. 145–157.

*Primary Examiner*—Jose L. Couso
*Assistant Examiner*—Anh Hong Do

*Attorney, Agent, or Firm*—Oblon, Spivak, McClelland, Maier & Neustadt, P.C.

[57] ABSTRACT

A two-dimensional information processing apparatus comprises a plurality of unit cell circuits arranged in a tow-dimensional matrix and each including a detector for detecting information as predetermined part of two-dimensional information, a storage circuit for storing the information detected by the detector, and a signal processing circuit for generating a pulse width modulation signal which has a pulse width corresponding to the information detected or stored, a plurality of address lines extending in a direction of columns of the matrix, and each connected to those unit cell circuits which are included in a corresponding one of the columns, a plurality of bus lines extending in a direction of rows of the matrix, and each connected to those unit cell circuits which are included in a corresponding one of the rows, means for selecting at least one of the address lines and supplying, through the selected address line, a control signal for generating a pulse width modulation signal to those unit cell circuits which are included in the selected bus line, and means for selecting at least one of the bus lines and reading, through the selected bus line, at least one pulse width modulation signal. The control signal includes a ramp signal, and the pulse modulation signal rises when the voltage of the ramp signal starts to increase, and falls when the voltage of the ramp signal is identical to a voltage determined on the basis of the information detected by the detector.

15 Claims, 7 Drawing Sheets

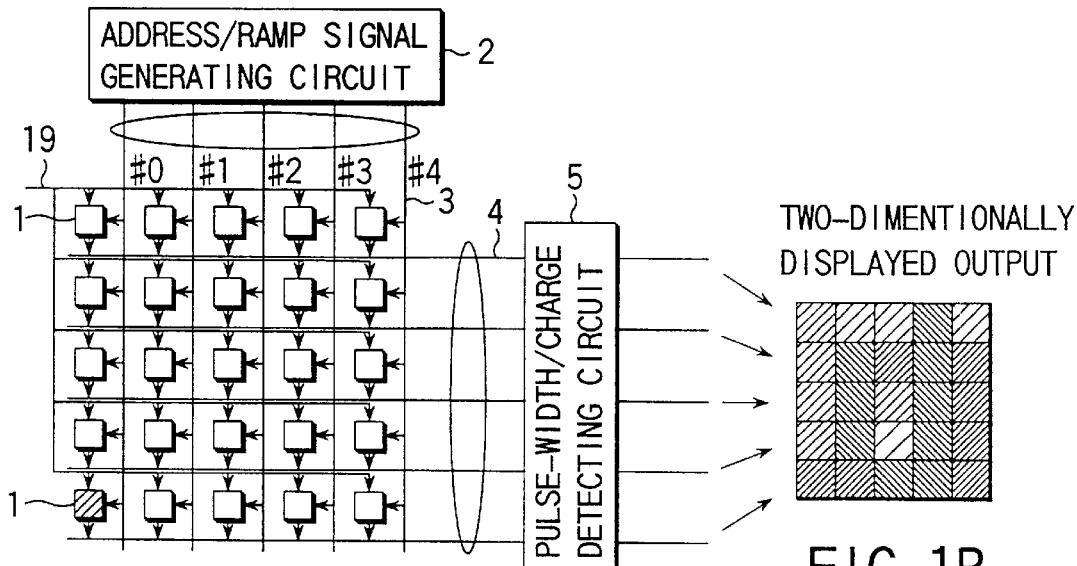
FIG. 1A
FIG. 1B
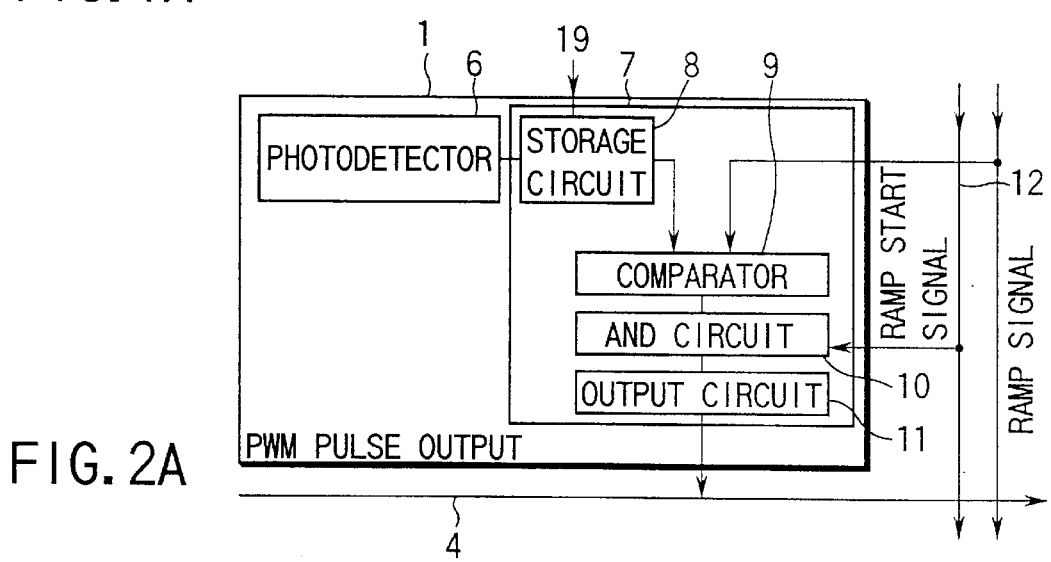
FIG. 2A
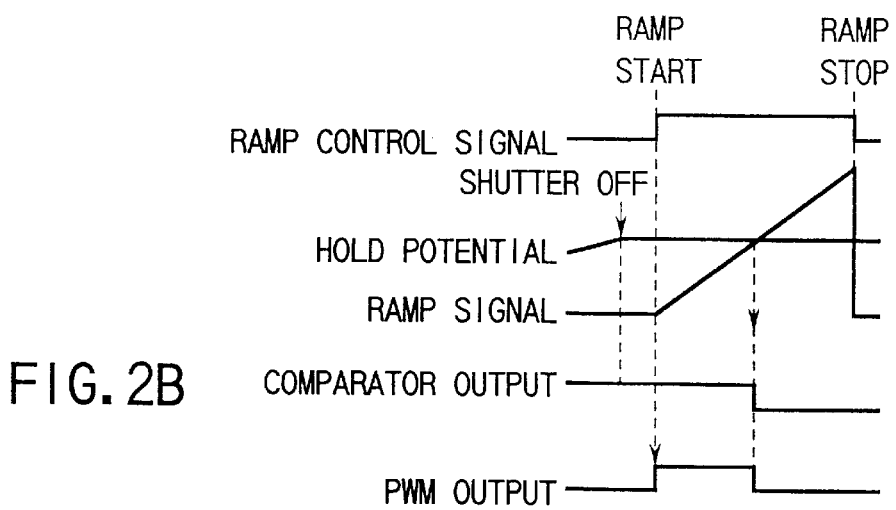
FIG. 2B

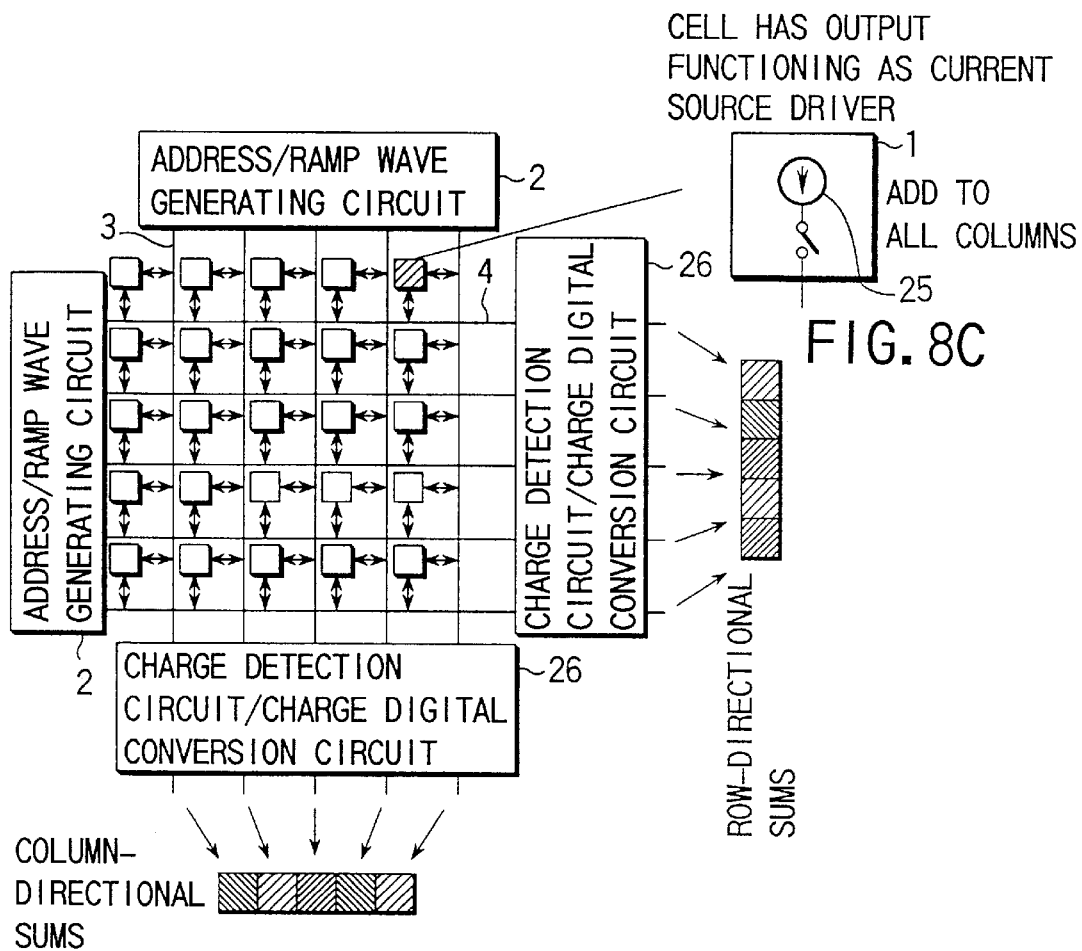
FIG. 8A EXAMPLE OF STRUCTURE
FIG. 8C
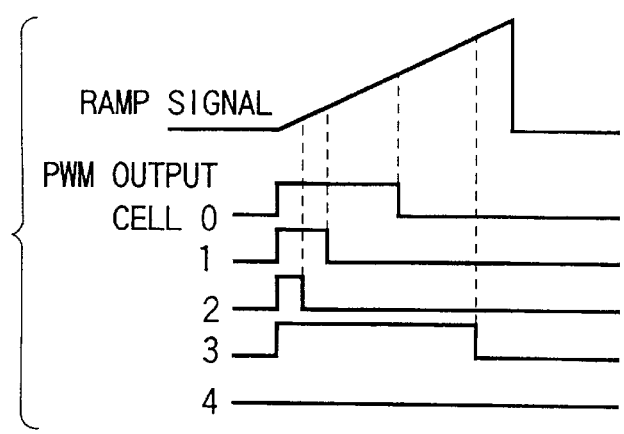
FIG. 8B TIMING CHART

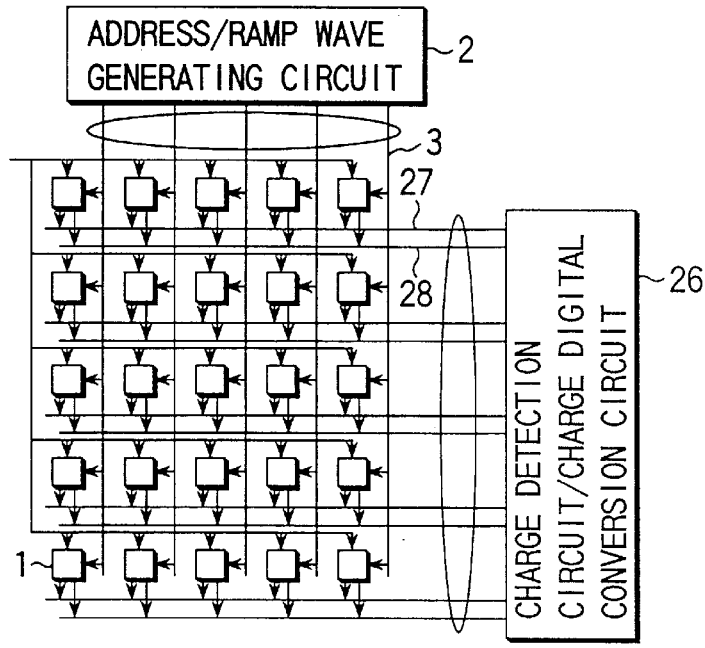
FIG. 11
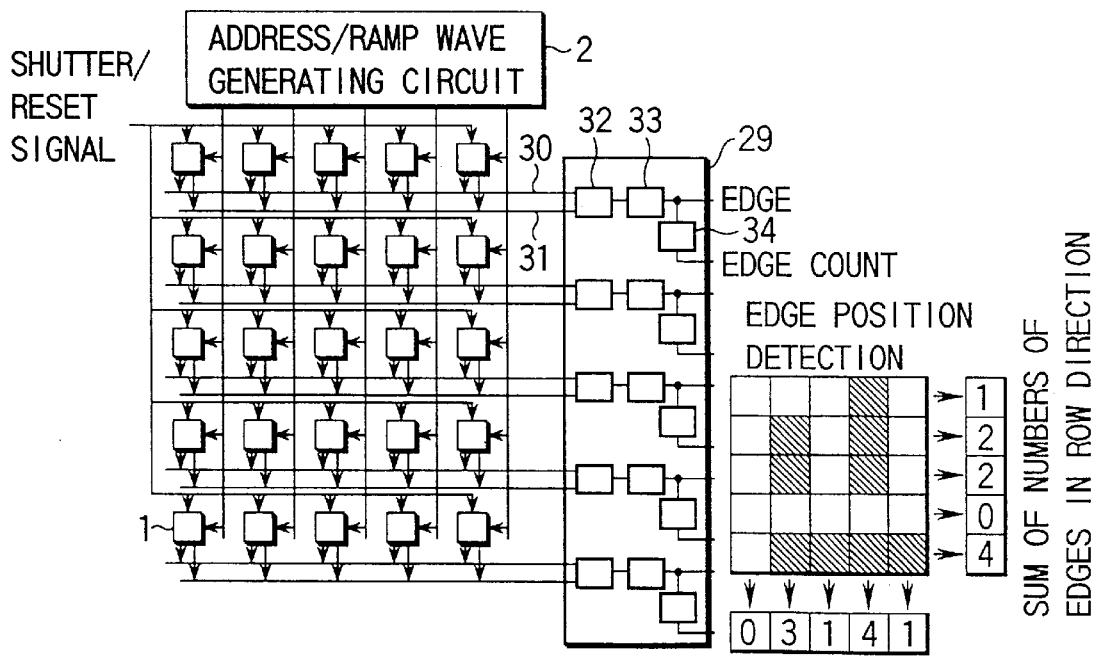
FIG. 12A
FIG. 12B

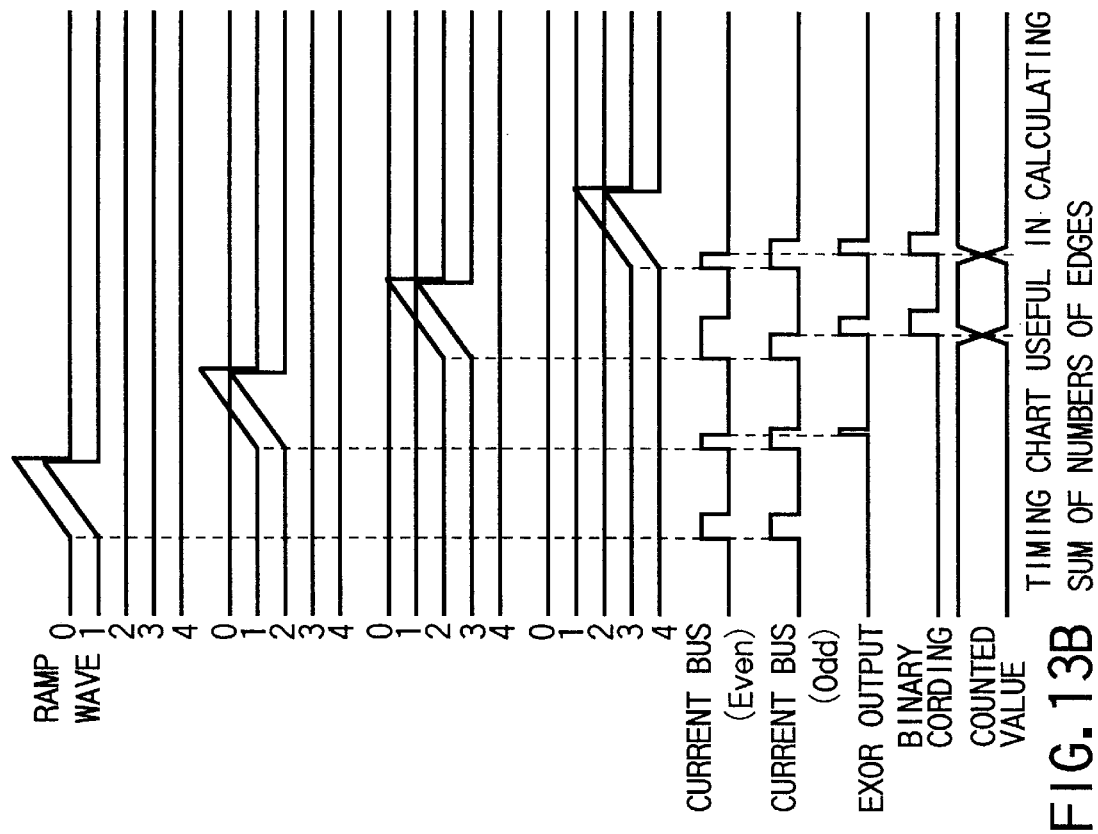
FIG. 13B TIMING CHART USEFUL IN CALCULATING SUM OF NUMBERS OF EDGES
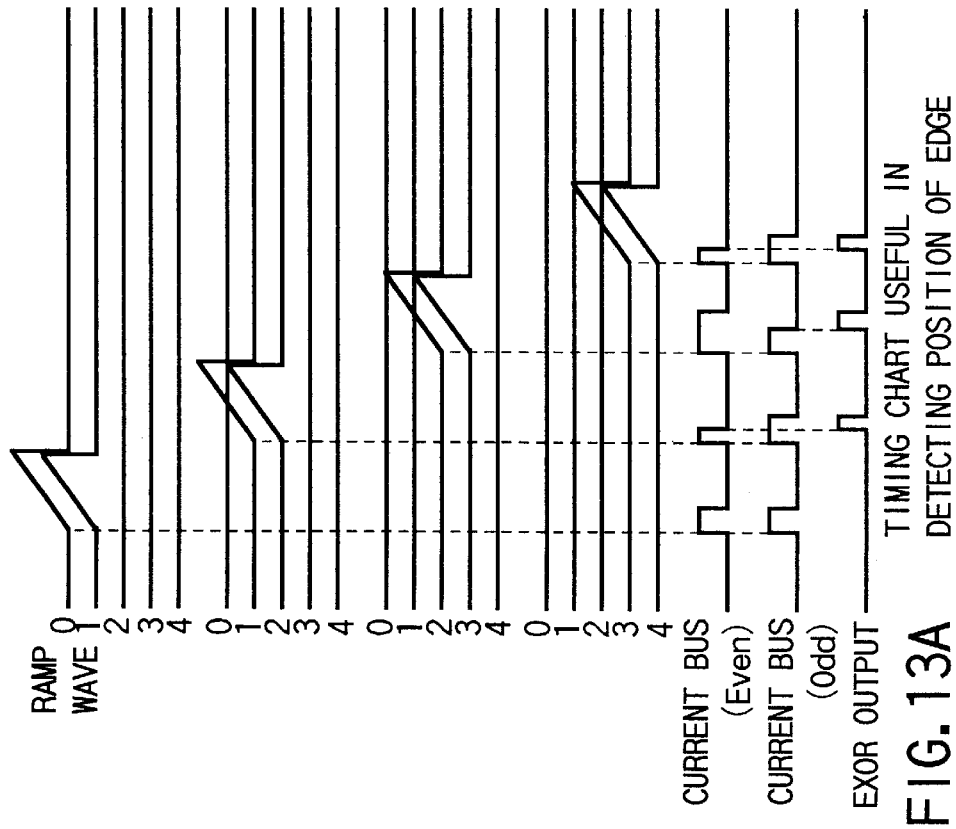
FIG. 13A TIMING CHART USEFUL IN DETECTING POSITION OF EDGE

APPARATUS FOR PROCESSING TWO-DIMENSIONAL INFORMATION

BACKGROUND OF THE INVENTION

This invention relates to an electronic field for realizing a multi-media information processing system which is used for storing and transmitting compressed information indicative of two-dimensional images, figures, etc., or for realizing a highly intelligent processing system which is used for extracting and recognizing the features of images, figures, etc.

It has been requested that the integration scale and operation speed of LSIs for use in computers or signal processing systems be increased. The conventional LSIs have been mainly used to form digital circuits. When an analog circuit is necessary, an AD or DA converter is generally interposed as an interface between the analog circuit and a digital circuit. The increase of the integration scale and operation speed of digital LSIs, however, will inevitably increase the power consumption. In other words, the increase of the integration scale and operation speed is limited in light of power consumption.

The conventional image and figure processing systems employ a structure in which information is input by an image sensor, then converted to a digital signal by an AD converter, and processed by a digital signal processor or a microprocessor. Although an information processing system using a digital circuit is most excellent in accuracy and stability, it requires multiple elements since it uses each transistor as a switching element. Increase of the integration scale and the operation speed of the system inevitably increases the energy consumption and limits the performance. Since the information processing architecture in the case of using a digital circuit is basically sequential processing, which is not suitable to parallel processing of two-dimensional information or calculation of multiple inputs employed in a neural network.

On the other hand, the analog circuit uses a transistor as a linear element such as an amplifier, and processes an analog signal whose level continuously varies with the passing of time. The analog circuit performs calculation on the basis of physical basic laws, and hence can realize the same function as the digital circuit, using $\frac{1}{10}$ or $\frac{1}{100}$ of the elements used in the digital circuit. Further, the former is excellent in relatively roughly grasping a state and judging it as a result of comparison, and is suitable for parallel operation. However, it is hard for the analog circuit to process information with high accuracy. In now available apparatuses each equipped with both analog and digital circuits, AD or DA conversion limits their performance, and noise (cross talk) leaking from the digital circuit to the analog circuit also limits their performance.

Image or figure processing sensors, which have been regarded as more and more important, are mainly provided in the form of CCD devices which treat input information as an analog charge amount. However, these devices are produced in a special process, and hence not suitable to integration with CMOS logic circuits for signal processing.

BRIEF SUMMARY OF THE INVENTION

To solve the above-described problems and realize a very large scale system capable of high speed operation, a novel architecture or circuit technique is necessary. The present invention has been developed in light of this, and is applicable to an information processing apparatus for performing detection of two-dimensional information such as an image, figure, etc., compression of information, and extraction of information features. The invention aims to provide an energy-saving, highly-performable information processing apparatus close to human intelligence, capable of processing high-level information indicative of images, figures, etc.

Specifically, the invention is applicable to an image sensor using a two-dimensional PN junction photodetector as an input device, a function image sensor wherein the image sensor itself has a function for processing pixels, an apparatus for processing two-dimensional information in a parallel manner to compress the information, an apparatus for extracting and recognizing features of a two-dimensional figure or image, a robot's eye device, a figure recognizing apparatus, or a two-dimensional information processing apparatus as an identification processing apparatus for identifying faces, finger prints, etc. The invention can reduce the number of elements incorporated in a CMOS or an LSI, to thereby reduce the chip area, increase the throughput and reduce the consumed energy.

To attain the object, there is provided a two-dimensional information processing apparatus, in which two-dimensional information is written optically or electrically into unit cells arranged in rows and columns, a ramp signal is selectively applied to the unit cells, and a pulse width modulation (PWM) signal pulse is generated from each of the selected unit cells, which pulse modulation signal rises when the voltage of the ramp signal starts to increase, and falls when the voltage of the ramp signal is identical to a voltage corresponding to the written information. PWM signal pulses from the unit cells are applied to a plurality of lines in a parallel manner in units of one row or one column.

This structure enables production of various apparatuses such as a two-dimensional information processing apparatus for reading information by scanning, an apparatus for calculating sums in units of one row or one column and outputting the calculation results, an apparatus for performing spatial filter calculation using sum-of-product calculation, an apparatus for detecting the position of an edge and outputting a signal indicative of the position, and an apparatus for calculating the sums of the numbers of edges in units of one row or one column and outputting the calculation results.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a view, showing a two-dimensional image sensor according to a first embodiment of the invention;

FIG. 1B is a view, showing a two-dimensionally displayed output from the two-dimensional image sensor;

FIG. 2A is a view, showing a unit cell circuit incorporated in the two-dimensional image sensor;

FIG. 2B is a timing chart, useful in explaining the operation of the unit cell circuit shown in FIG. 2A;

FIG. 8A is a view, showing a processing apparatus according to a second embodiment of the invention, for calculating, in a parallel manner, row-directional cell information data sums;

FIG. 8B is a timing chart, useful in explaining the operation of the processing apparatus of FIG. 8A;

FIG. 8C is a view, showing that the processing apparatus of FIG. 8A is a current source drive;

FIG. 11 is a view, showing an embodiment of the invention which employs a positive polarity bus and a negative polarity bus;

FIG. 12A is a view, showing a structural example of an edge processing apparatus according to a fourth embodiment of the invention;

FIG. 12B is a view, showing a detection result of the edge processing apparatus; and FIGS. 13A and 13B are timing charts, useful in explaining the edge processing operation of the fourth embodiment.

DETAILED DESCRIPTION OF THE INVENTION

Figure 3:
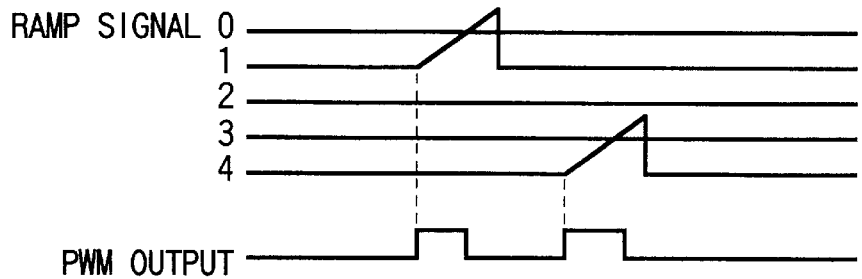
FIG. 3 is a timing chart, useful in explaining the operation of the two-dimensional sensor which is performed when the sensor addresses and reads any voluntary cell.

Pulse modulation signals, which have a two-value amplitude and carry information on a time basis, include a pulse width modulation (PWM) signal, a pulse phase modulation (PPM) signal and a pulse density modulation (PDM) signal. The pulse width modulation (PWM) signal has a pulse width indicative of analog information, and is considered as an intermediate signal between an analog signal and a digital signal. An analog digital mixture circuit which has both merits of the analog signal and the digital signal can be constituted using the PWM signal. Since a single PWM signal can represent multi-bit information, only a small amount of energy is consumed to perform data transmission or arithmetic operations. Further, a great number of signals can be added in a parallel manner by adding PWM signals which are in the form of current values. Parallel addition realizes a high-level calculation function, and analog operations save power. Concerning the basic structure of the digital analog mixture circuit, see IEICE TRANS.FUNDAMENTALS, VOL. E79-A, NO.2, FEBRUARY 1996, PP.145–157 "A Concept of Analog-Digital Merged Circuit Architecture for Future VLSIs" written by Atsusi IWATA, Makoto NAGATA.

The present invention uses the PWM signal which has a data transmission and arithmetic function of high accuracy and low energy, for the following purposes:

(1) To efficiently read information from a two-dimensional storage; and (2) To use the parallel calculation function in order to compress the information and extract its features (for example, addition of two-dimensional data items; calculation of the product-of-sum of the data items; application of the invention as a spatial filter; detection of edges; addition of the numbers of edges)

Two-dimensional information processing apparatuses according to the embodiments of the invention will be described in detail with reference to the accompanying drawings. In the embodiments, like reference numeral denotes like element. The invention is not limited to the embodiments, but may be modified in various manners.

First Embodiment

As is shown in FIG. 1A, a plurality of unit cell circuits 1 are arranged in a matrix. Each unit cell circuit 1 is connected to a corresponding one of a plurality of address lines 3 which extend from an address ramp signal generation circuit 2 in a column direction. Each address line 3 can be formed as part of a bus line which includes another signal line. The address ramp signal generation circuit 2 supplies each selected cell with a control signal which includes a ramp signal and a ramp start signal. The output of each unit cell circuit 1 is connected to a corresponding one of a plurality of bus lines 4 which extend in a row direction and are connected to a pulse-width/charge detection circuit 5 for reading a pulse width modulation output signal. At the time of inputting external two-dimensional optical information, light is applied to the overall surface of the matrix. FIG. 1B shows an example of a two-dimensionally displayed output obtained by processing the input optical information using the two-dimensional information processing apparatus of the first embodiment.

FIG. 2A shows an example of the unit cell circuit 1, while FIG. 2B shows the timing chart of the circuit. The unit cell circuit 1 has a photodetector 6 and a signal processing circuit 7 connected thereto. The signal processing circuit 7 has a function for generating a PWM signal with a pulse width corresponding to the amount of optical information detected by the photodetector 6, and comprises a storage circuit 8, a comparator 9, an AND circuit 10 and an output circuit 11 in this embodiment. The photodetector 6 is formed of a PN junction prepared by the LSI technique, or of a photo transistor. Light is converted to current, integrated for a certain period of time and stored as an electric charge in the storage circuit 8. The comparator 9 compares a voltage determined from the stored charge with the linearly varying voltage of a ramp signal supplied through a corresponding address line 3. The PWM signal pulse is raised when the voltage of the ramp signal starts to increase, and is fallen when the comparator 9 has detected that the voltage determined from the charge stored in the cell and the ramp signal voltage are identical to each other. The AND circuit 10 connected to the comparator 9 and a ramp start signal line 12 controls the rise and fall of the PWM pulse on the basis of the ramp start signal and the output of the comparator 9. On the basis of this control, the output circuit 11 connected to the AND circuit 10 generates a PWM signal of a pulse width corresponding to the output of the photodetector 6.

The signal processing circuit 7 can have any voluntary structure if it generates a PWM signal of a pulse width corresponding to the output of the photodetector 6. Further, the two-dimensional information input to the unit cell from the outside is not limited to optical information but may be electric information. In this case, a detector for detecting electric information is used in place of the photodetector 6. Moreover, the detected information may be directly converted to a PWM signal without being stored in the storage circuit.

The address ramp signal generation circuit 2 has a function for simultaneously supplying a ramp signal through a corresponding address line 3 to those unit cells which are included in any desired column. When as is shown in FIG. 3, ramp signal pulses are sequentially supplied to designated address lines (#1, #4), information items in the unit cell circuits connected to the lines can be read as PWM signal pulses in units of one row. Thus, a voluntary column can be accessed at random.

Figure 4:
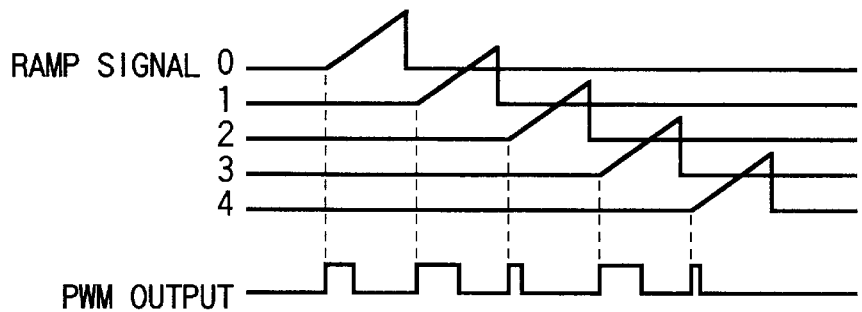
FIG. 4 is a timing chart, useful in explaining the operation of the two-dimensional image sensor which is assumed when it addresses a voluntary cell to read a photo detector output.

To sequentially scan cell information items and read them, ramp signal pulses are sequentially supplied to the address lines. When ramp signal pulses are sequentially applied to the address lines (#0–#4) from the leftmost one as shown in FIG. 4, scan is performed from left to right in the row direction, thereby outputting, as PWM pulses, cell information items included in each column. Since in this operation, rows can be scanned in a parallel manner, the two-dimensional information can be read at high speed. In addition, serial scanning of two-dimensional information can also be performed by applying a selection signal in the column direction, too. In this case, after PWM pulses of a certain row are outputted, another row to be accessed next is selected using the selection signal. Naturally, the structure can be modified such that in each of the above-described operations, column-directional scanning is performed instead of the row-directional scanning.

The dynamic range of the PWM signal is determined on the basis of the maximum-pulse-width/time-resolution. It is, of course, necessary to set an appropriate dynamic range in accordance with information to be dealt with. In a CCD image device, noise such as crosstalk is liable to occur since an analog charge is directly transmitted on a transmission line. On the other hand, in the present invention, a charge is converted to a PWM signal in each unit cell. The use of the PWM signal prevents the signal quality through the information transmission route such as a bus line, from easily degrading.

FIG. 5 shows a specific circuit example in which a CMOS is used in the unit cell circuit 1. FIG. 5A illustrate the structure of its basic circuit. In this structure, the photodetector 6 consists of a photo transistor 13, the storage circuit 8 consists of a combination of a MOS transistor 16 serving as a shutter switch and a capacitor 17, and the comparator 9 consists of a CMOS inverter 14 with a resetting feedback switch 15. FIG. 5B illustrates the operation of the basic circuit assumed at the time of reset, FIG. 5C the operation assumed at the time of input integration, and FIG. 5D charge-PWM conversion.

Figure 5A:
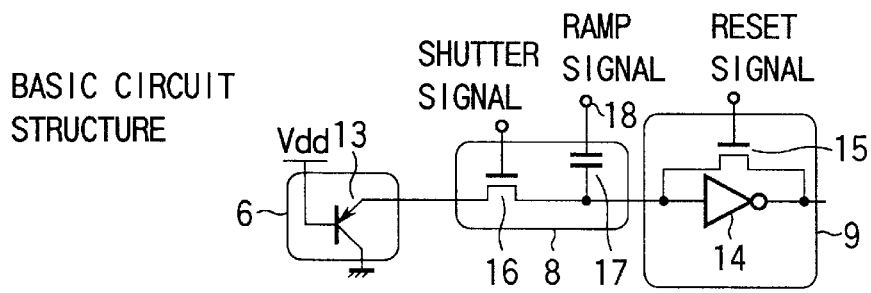
FIG. 5A is a view, showing the basic structure of a cell circuit incorporated in the two-dimensional image sensor.
Figure 5B:
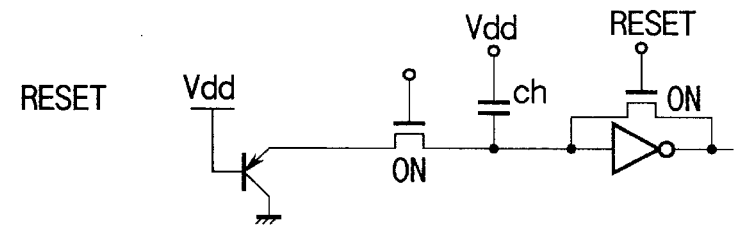
FIG. 5B is a view, useful in explaining the reset operation of the cell circuit.
Figure 5C:
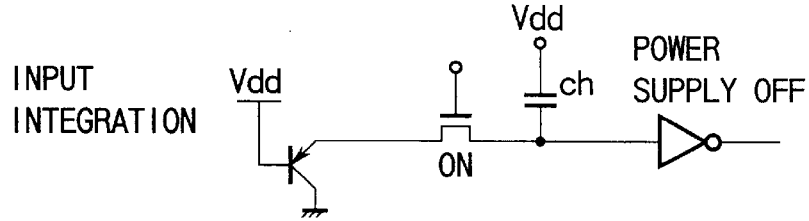
FIG. 5C is a view, useful in explaining input integration performed by the cell circuit.
Figure 5D:
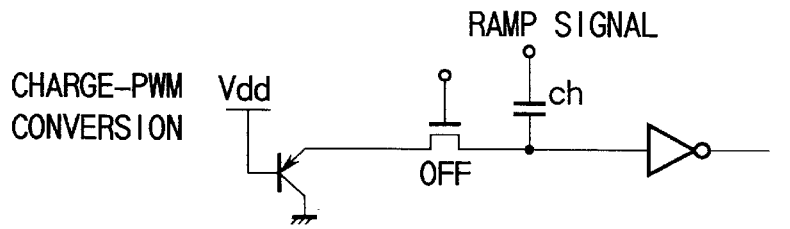
FIG. 5D is a view, useful in explaining charge-PWM conversion performed by the cell circuit.
Figure 6:
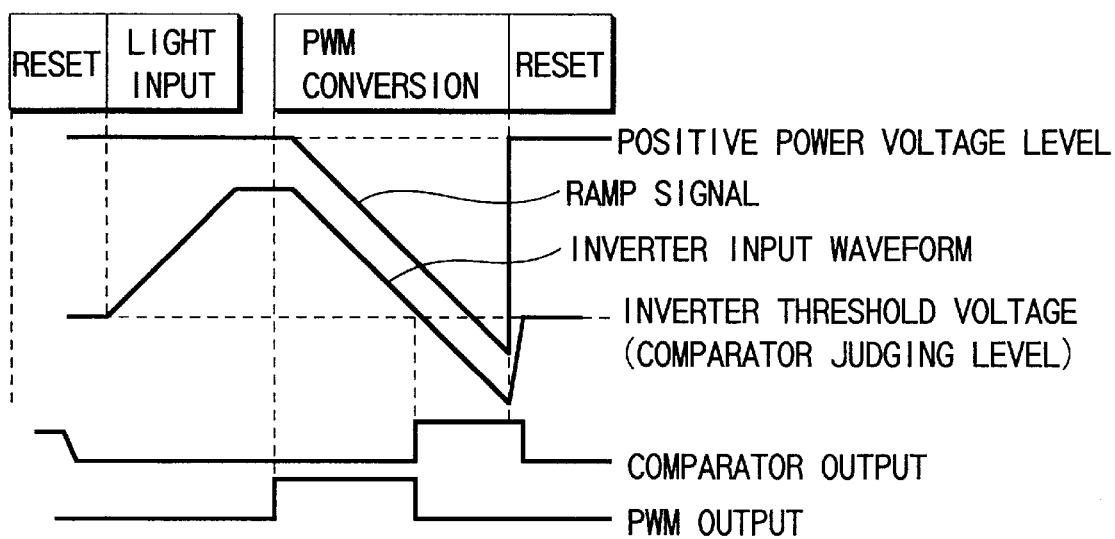
FIG. 6 is an operation wave/timing chart, illustrating the operation of the cell circuit.

FIG. 6 is an operation-wave/timing chart of the circuit. First, the circuit is reset (FIG. 5B), and the feedback switch 15 of the comparator 9 and the shutter switch 16 of the storage circuit 8 are turned on to thereby accumulate, in the capacitor 17, a charge which compensates for fluctuation of the threshold voltage of the inverter 14. Subsequently, the photo transistor 13 detects light corresponding to each pixel of a two-dimensional pattern, and a light current corresponding to the detected light is accumulated in the capacitor 17 through the shutter switch 16 (FIG. 5C). Then, an address ramp signal is applied to the other terminal 18 of the capacitor 17 after the shutter switch 16 is turned off by a shutter signal from a shutter 19 (FIG. 5D). Since the charge in the capacitor 17 is held, the input voltage of the inverter 14 lowers as the level of the ramp signal lowers, and the output of the inverter 14 is inverted when the input voltage reaches its threshold voltage. The PWM signal can be generated by connecting a flip flop (not shown) which is set when the ramp signal starts to be raised, and reset when the output of the comparator 9 is inverted.

Although in the above-described operation, accumulation of charge due to light input and the generation of the PWM signal are performed serially, it can be modified such that the accumulation and the generation are performed parallel to each other in a pipelining manner.

Figure 7A:
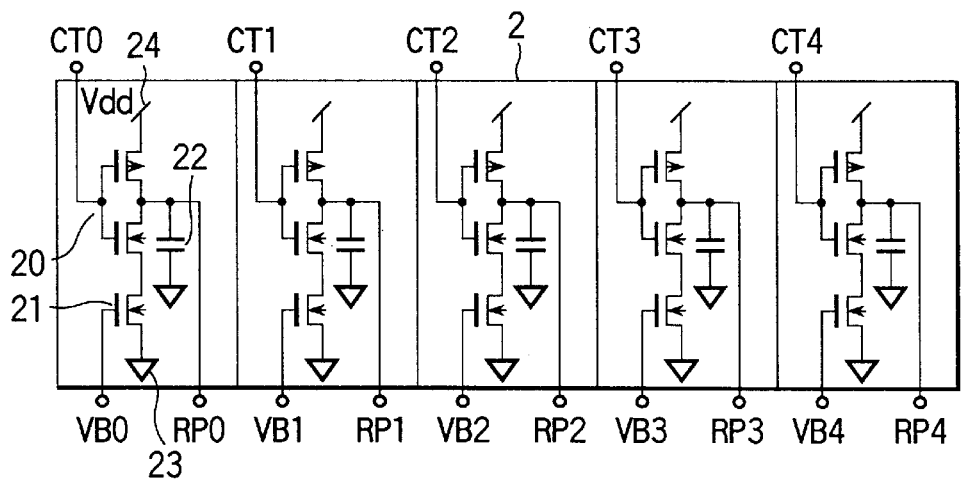
FIG. 7A is a circuit diagram, showing a five-line address ramp signal generation circuit incorporated in the cell circuit of the two-dimensional sensor.
Figure 7B:
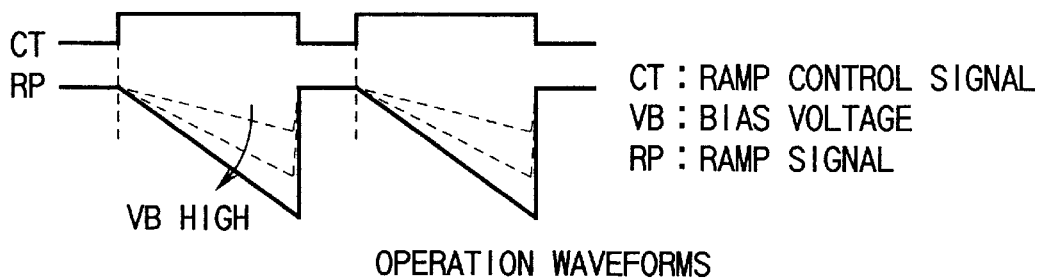
FIG. 7B is a view, showing the operation wave of the address ramp signal generation circuit.

FIG. 7 shows an example of a five-line address ramp signal generation circuit 2. Each line includes a CMOS switch 20, a charge integration capacitor 22, and a MOS transistor 21 for generating a constant current I used at the time of discharge of the MOS transistor 21. When a ramp control signal CT is at high level, the constant current I flows and the charge of the capacitor 22 is discharged to a ground terminal 23, and therefore the voltage of the capacitor 22 linearly reduces. When, on the other hand, the ramp control signal CT is at low level, the capacitor 22 is rapidly charged, and the ramp signal is set at the voltage Vdd of a positive power 24. The wave inclination of the ramp signal (RP0–RP4) can be set at any voluntary value by controlling the channel width and the gate bias voltage (VB0–VB4) of the MOS transistor 21. The inclination is $dV/dt=I/Ct$ (where Ct is a value obtained by adding, to the capacitance of the capacitor 22, the parasitic capacitance of a line for supplying the ramp signal or of a load circuit connected to the line). The ramp signal (RP0–RP4) applied to each column is generated by a circuit dedicated thereto and having the same structure as another circuit dedicated to another column. Since the variation range of elements on the integrated circuit chip is relatively small, the ramp signal RP has a high relative accuracy.

Second Embodiment

As is shown in FIG. 8, the second embodiment differs from the first embodiment wherein row-directional cell information items are added together in a parallel manner, in that the former employs a current supply driving circuit 25 in place of the output circuit 11 for outputting the PWM signal of the unit cell circuit 1. FIG. 8C shows no specific circuit structure of the current supply driving circuit 2. It can have any desired circuit structure. FIG. 8C shows only the output circuit of the unit cell circuit 1 and no other elements.

FIG. 8A is a view, showing an example of a circuit for projecting figure information in both the row and column directions, while FIG. 8B is a timing chart, useful in explaining the operation of the circuit. Since the output impedance of the current supply driving circuit 25 is high, pulse currents of the cells are added together in the bus line 4.

The address ramp signal generation circuit 2 has a function for simultaneously applying the ramp signal and the PWM signal to each address line 3. In this circuit, the sum of all row-directional cell information items can be obtained in the form of a charge by integrating the output current of the bus line 4. Thus, row-directional cell information items can be added together in an analog manner. The addition result is output as digital data from a charge detection circuit/charge-digital conversion circuit 26. The charge detection circuit/charge-digital conversion circuit 26 can have a voluntary structure. It suffices if the circuit can detect a charge on each bus line and convert it to a digital amount.

It is a matter of course that the circuit can be modified such that column-directional cell information items are added together. Specifically, the address ramp signal generation circuit 2 can be connected to each row, and the charge detection circuit/charge-digital conversion circuit 26 can be connected to each column. The addition result is output as digital data from the charge detection circuit/charge-digital conversion circuit 26. Appropriate addition is, of course, performed alternately in the row and column directions under the control of a control circuit (not shown). Information obtained by this processing indicates a profile of figure information projected in the X- and Y-axis directions (in the horizontal and vertical directions in FIG. 8A, respectively), and is used as feature information on a figure.

Third Embodiment

Figure 9:
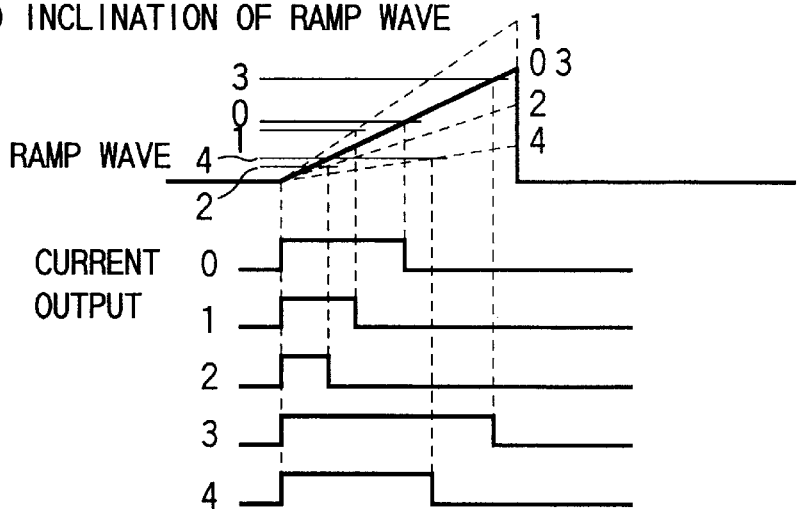
FIG. 9 is a timing chart, useful in explaining the operation of the processing apparatus performed when it outputs a sum by multiplying each row-directional cell value by a coefficient.

In the third embodiment, the sum-of-product is calculated using the structure of the second embodiment. FIG. 9 is a timing chart, useful in explaining the operation performed in the case of outputting a value which is obtained by multiplying the amount of information stored in each unit cell 1 (i.e. the voltage of the capacitor of the cell) by a coefficient, and then adding together the multiplication results. In this embodiment, ramp signals with waves of different inclinations are applied to different columns to calculate the sum of the cell outputs multiplied by the coefficient, i.e. the sum-of-product concerning the cell outputs. The inclination of the ramp signal is controlled by a bias voltage VB applied to the MOS transistor 21 which is incorporated in the address ramp signal generation circuit 2 for generating a constant current. A voltage corresponding to the information amount of each cell is compared with that of the ramp signal. This means that the greater the inclination of the ramp signal, the lower the coefficient to be applied to information accumulated in each unit cell (and vice versa). PWM signals from the unit cells are integrated as a current supply output through the bus line 4. The integrated charge is the result of sum-of-product calculation. As a result, one-dimensional spatial filter calculation can be performed in a parallel manner. It is a matter of course that the third embodiment can be modified to perform column-directional sum-of-product calculation instead of the row-directional sum-of-product calculation.

Figure 10:
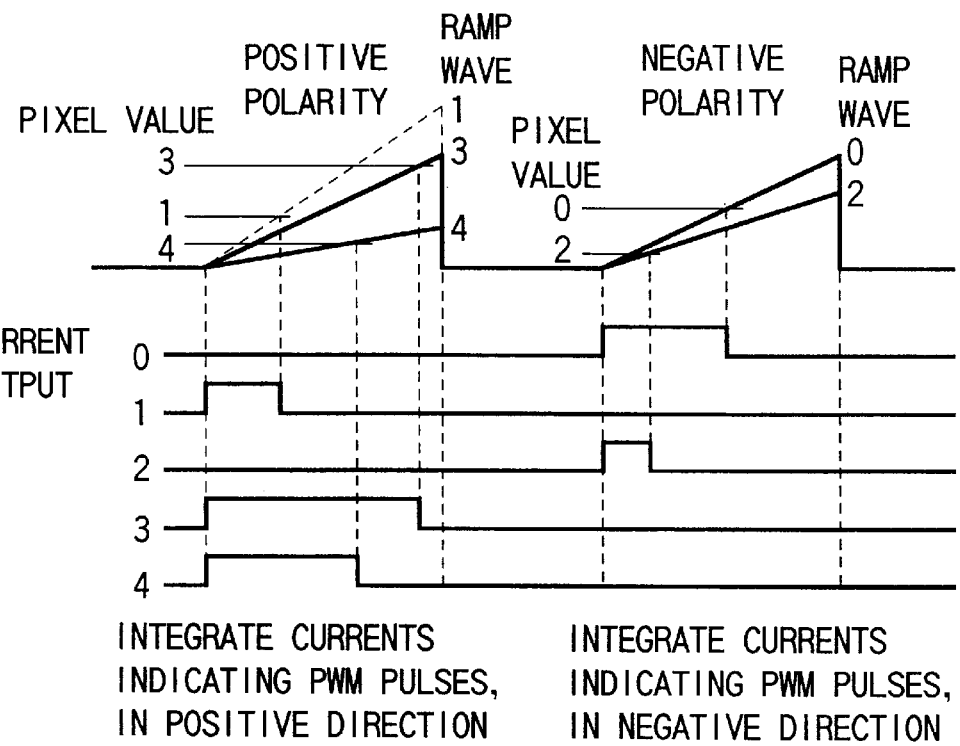
FIG. 10 is a timing chart, useful in explaining the operation of the processing apparatus performed when it outputs a sum by multiplying each row-directional cell value by a bipolar coefficient.

In the case of discrete cosine conversion which is often used in usual image compression processing, it is necessary to obtain the sum-of-product by multiplying a image value by a cosine coefficient. The cosine coefficient can assume a positive value and a negative value. In the case of calculation including both polarities, it is necessary to serially generate positive and negative outputs, to obtain the difference therebetween and to attach a sign (a positive or negative sign) to the difference, as is shown in FIG. 10.

Alternatively, the discrete cosine conversion can be realized by providing a positive polarity bus 27 and a negative polarity bus 28, integrating positive outputs in the positive polarity bus and negative outputs in the negative polarity bus, respectively, and calculating the difference therebetween.

Fourth Embodiment

The fourth embodiment differs from the third embodiment in that an edge detection circuit 29 is used in place of the charge detection circuit/charge-digital conversion circuit 26. This structure enables detection of a two-dimensional pattern edge. As is shown in FIG. 12, two kinds of bus lines, i.e. an even number bus line 30 and an odd number bus line 31, are employed and connected to each even number cell and each odd number cell, respectively. Ramp signals are applied to a voluntary cell and a cell adjacent thereto, and PWM signals output from the cells are applied to an EXOR circuit 32 through the even number/odd number bas lines, thereby to calculate the difference in pulse width therebetween. When the pulse width difference exceeds a predetermined threshold value, it is determined that an edge exists. The sign of the edge (left>right, right>left) can be determined by calculating the logical product of the output of the EXOR circuit 32 and the output of the even number bus line 30, and the logical product of the output of the ECOR circuit 32 and the output of the odd number bus line 31. As a result, the position of the edge can be read using the ramp signal as its address, as is shown in FIG. 13($a$). This edge information is extremely important to process an image of a figure.

Further, in the circuit of FIG. 12A, the sum of the numbers of row-directional edges can be obtained by sequentially and row-directionally scanning two ramp signals applied to even and odd cells, applying the PWM signals output from the cells to the EXOR circuit 32, outputting the difference between the output signals of the even and odd cells, binarizing the output difference, using a binarizing circuit 33, when it exceeds a threshold value, and counting, using a counter circuit 34, the number of signal pulses output from the binarizing circuit, as is shown in FIG. 13B. If scanning is performed in the column direction, the sum of the numbers of column-directional edges can be obtained. This edge information is also useful as feature information on a figure. Each of the binarizing circuit 33 and the counter circuit 34 can be formed of any voluntary circuit. The comparison of the output difference with the threshold value is performed using a voluntary comparison circuit (not shown).

This comparison processing is performed simultaneously in rows. Naturally, the processing can be modified to be performed simultaneously in columns. Since the feature of a figure is expressed by a one-dimensionally projected profile, the shape of each edge, or the number of edges, the figure can be recognized by comparing the feature with a reference template and selecting a most similar one.

As described above, the invention has the following advantages:

Since information in each cell is processed on the two-dimensional surface of a sensor, high-level processing can be performed which is impossible in the conventional case where a CCD image sensor as a serial scanner is used. Since the invention employs an analog/digital mixture circuit using PWM signals, the number of required elements can be reduced to $\frac{1}{10}$ or $\frac{1}{100}$. A small number of elements enables a device of a small chip area. Further, since multiple inputs can be processed in an analog manner and in a parallel manner, the processing capacity can be increased by 10 times. Since there are a small number of circuit nodes in the invention and the voltage transition frequency therein is low, the consumed energy can be reduced to $\frac{1}{10}$ or $\frac{1}{100}$. Since the invention is suitable for fine CMOS device techniques of the order of 0.1 micron or less, it is considered that the invention will serve as a basic technique for future intelligent information processing systems, and impact on the industry.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A two-dimensional information processing apparatus comprising:
 a plurality of unit cell circuits arranged in a tow-dimensional matrix and each including a detector for detecting information as predetermined part of two-dimensional information, a storage circuit for storing information detected by the detector, and a signal processing circuit for generating a pulse width modulation signal which has a pulse width corresponding to the information detected or stored;
 a plurality of address lines extending in a direction of columns of the matrix, and each connected to those unit cell circuits which are included in a corresponding one of the columns;
 a plurality of bus lines extending in a direction of rows of the matrix, and each connected to those unit cell circuits which are included in a corresponding one of the rows;
 means for selecting at least one of the address lines and supplying those unit cell circuits which are included in the selected address line, with a control signal for causing those unit cell circuits to generate pulse width modulation signals; and
 means for selecting at least one of the bus lines and reading, through the selected bus line, at least one of the pulse width modulation signals.

2. The apparatus according to claim 1, wherein the control signal includes a ramp signal, and the pulse modulation signal rises when the voltage of the ramp signal starts to increase, and falls when the voltage of the ramp signal is identical to a voltage determined on the basis of the information detected by the detector.

3. The apparatus according to claim 1, wherein the two-dimensional information is optical information, and the detector is a photodetector.

4. The apparatus according to claim 2, wherein the two-dimensional information is optical information, and the detector is a photodetector.

5. The apparatus according to claim 1, wherein the means for selecting at least one of the address lines includes means for designating any voluntary one of the address lines, and the reading means includes means for reading, through corresponding at least one bus line, a pulse width modulation signal generated in at least one of the unit cell circuits which are connected to the designated address line.

6. The apparatus according to claims 2, wherein the means for selecting at least one of the address lines includes means for designating any voluntary one of the address lines, and the reading means includes means for reading, through corresponding at least one bus line, a pulse width modulation signal generated in at least one of the unit cell circuits which are connected to the designated first bus line.

7. The apparatus according to claim 1, wherein the means for selecting at least one of the address lines includes means for sequentially scanning the address lines for selection thereof and sequentially supplying a ramp signal to the selected address lines, and the reading means includes means for sequentially reading generated pulse modulation signals through the at least one bus line.

8. The apparatus according to claim 2, wherein the means for selecting at least one of the address lines includes means for sequentially scanning the address lines for selection thereof and sequentially supplying a ramp signal to the selected address lines, and the reading means includes means for sequentially reading generated pulse modulation signals through the at least one bus line.

9. The apparatus according to claim 1, wherein the signal processing circuit has an output circuit, as a current supply driving circuit, for outputting the pulse width modulation signal, the means for selecting at least one of the address lines includes means for simultaneously selecting some of the address lines and supplying them with a ramp signal, and the reading means includes means for adding together currents in each of the bus lines, which currents indicate pulse width modulation signals output from row-directional unit cell circuits, and obtaining the sum of information items represented by pulse width modulation signals output in the form of charges from the row-directional unit cell circuits.

10. The apparatus according to claim 2, wherein the signal processing circuit has an output circuit, as a current supply driving circuit, for outputting the pulse width modulation signal, the means for selecting at least one of the address lines includes means for simultaneously selecting some of the address lines and supplying them with a ramp signal, and the reading means includes means for adding together currents in each of the bus lines, which currents indicate pulse width modulation signals output from row-directional unit cell circuits, and obtaining the sum of information items represented by pulse width modulation signals output in the form of charges from the row-directional unit cell circuits.

11. The apparatus according to claim 9, wherein the ramp signal supplied to the address lines has a waveform with an inclination corresponding to a predetermined coefficient, in order to output, as the pulse width modulation signal, a value obtained by multiplying the detected information amount by the predetermined coefficient.

12. The apparatus according to claim 11, wherein when the predetermined coefficient has a positive polarity and a negative polarity, the reading means includes means for obtaining the sum of outputs which are multiplied by the positive coefficient and the sum of outputs which are multiplied by the negative coefficient, and calculating the differences between the sums.

13. The apparatus according to claim 11, wherein the bus lines each include a positive polarity bus line for receiving outputs when the predetermined coefficient is positive, and a negative polarity bus line for receiving outputs when the predetermined coefficient is negative, and the reading means includes means for calculating the difference between the sum of the outputs received in the positive polarity bus line and the sum of the outputs received in the negative polarity bus line.

14. The apparatus according to claim 1, wherein in order to detect whether or not the two-dimensional information contains a pattern edge, and to detect the position of the pattern edge, each of the address line and bus line selecting means selects each pair of adjacent ones of the unit cell circuits, and the reading means calculates the difference in pulse width between pulse width modulation signals output from the pair of adjacent unit cell circuits, and compares the difference with a threshold value.

15. The apparatus according to claim 2, wherein in order to detect whether or not the two-dimensional information contains a pattern edge, and to detect the position of the pattern edge, each of the address line and bus line selecting means selects each pair of adjacent ones of the unit cell circuits, and the reading means calculates the difference in pulse width between pulse width modulation signals output from the pair of adjacent unit cell circuits, and compares the difference with a threshold value.

* * * * *